(12) United States Patent
Serero et al.

(10) Patent No.: US 10,631,257 B1
(45) Date of Patent: Apr. 21, 2020

(54) SYSTEM AND METHOD FOR PROVIDING ENHANCED ROUTING IN A CONTACT CENTER

(71) Applicant: Avaya Inc., Santa Clara, CA (US)

(72) Inventors: Eyal Serero, Giv'atayim (IL); Gal Netanel, Kfar Saba (IL); Ronen Bar-Yoav, Geulim (IL); Roman Nekrashevich, Rishon LeZion (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/201,579

(22) Filed: Nov. 27, 2018

(51) Int. Cl.
| | | |
|---|---|---|
| *H04M 3/523* | (2006.01) | |
| *H04W 52/36* | (2009.01) | |
| *H04W 72/04* | (2009.01) | |
| *H04L 5/00* | (2006.01) | |
| *H04W 52/14* | (2009.01) | |

(52) U.S. Cl.
CPC .......... *H04W 52/365* (2013.01); *H04L 5/001* (2013.01); *H04L 5/0094* (2013.01); *H04W 72/0406* (2013.01); *H04L 5/0007* (2013.01); *H04W 52/146* (2013.01); *H04W 72/0446* (2013.01)

(58) Field of Classification Search
CPC ... G06F 8/70; G06F 9/44; G06F 11/07; G06F 17/30; G06F 15/16; G06N 3/08; G06N 5/04; G06N 20/00; G06N 99/00; G06N 3/00; G06Q 20/40; G06Q 10/06; G06Q 30/00; G06Q 30/02; G07C 5/08; G10L 13/02; G10L 15/06; G10L 13/027; H04L 12/24; H04L 12/58; H04L 51/02; H04L 67/12; H04M 3/00; H04M 3/22; H04M 3/51; H04M 3/5166; H04M 3/5191; H04M 3/5232; H04M 3/523; H04M 3/436; H04M 3/493; H04W 4/00; H04W 4/22; G08B 25/00
USPC ................ 370/389; 379/88.01, 88.04, 88.18, 379/265.03, 265.09; 455/466; 706/12, 706/45; 704/246; 705/7.37; 709/221
See application file for complete search history.

(56) References Cited

U.S. PATENT DOCUMENTS

| | | | | |
|---|---|---|---|---|
| 7,809,663 | B1 * | 10/2010 | Birch ..................... | G06N 20/00 706/45 |
| 8,170,587 | B2 * | 5/2012 | Daniel ................ | H04L 12/1859 340/7.52 |

(Continued)

*Primary Examiner* — Gerald Gauthier
(74) *Attorney, Agent, or Firm* — Sheridan Ross P.C.

(57) ABSTRACT

A first request to establish a communication session with a contact center is received from a user communication device. For example, a request to establish a voice communication session is received at the contact center. A machine learning model uses prior communication sessions with the contact center to identify a first set of one or more sensors that are external to the user communication device. External sensor information is received (e.g., during the request to establish the communication session) by the contact center. The external sensor information is from the first set of one or more sensors that are external to the user communication device. The communication session in the contact center is routed based on the received external sensor information. For example, instead of the communication session being routed to an Interactive Voice Response (IVR) system, the communication session is routed to a high priority contact center queue.

20 Claims, 6 Drawing Sheets

(56) References Cited

U.S. PATENT DOCUMENTS

| | | | | |
|---|---|---|---|---|
| 9,015,250 B1* | 4/2015 | Peloski | H04L 67/327 | 709/205 |
| 10,003,508 B1* | 6/2018 | Cogan | H04L 41/5061 | |
| 10,044,647 B1* | 8/2018 | Karp | H04W 4/14 | |
| 10,229,370 B1* | 3/2019 | Merritt | G06N 5/022 | |
| 10,277,743 B1* | 4/2019 | Agarwal | G10L 15/1815 | |
| 10,306,068 B1* | 5/2019 | Chadha | H04M 3/523 | |
| 10,356,244 B1* | 7/2019 | Sengupta | H04M 3/5232 | |
| 10,380,516 B1* | 8/2019 | Kislaki | G06Q 10/063114 | |
| 10,440,187 B1* | 10/2019 | Mandel | H04M 3/5183 | |
| 10,484,532 B1* | 11/2019 | Newman | H04M 3/2281 | |
| 2002/0141404 A1* | 10/2002 | Wengrovitz | H04L 29/06027 | 370/389 |
| 2004/0017898 A1* | 1/2004 | Reynolds | H04L 29/06027 | 379/88.18 |
| 2010/0104086 A1* | 4/2010 | Park | G10L 15/04 | 379/265.09 |
| 2010/0215156 A1* | 8/2010 | Sun | H04M 3/493 | 379/88.04 |
| 2013/0191185 A1* | 7/2013 | Galvin | G06Q 10/10 | 705/7.37 |
| 2014/0140494 A1* | 5/2014 | Zhakov | H04M 3/5175 | 379/265.03 |
| 2015/0213800 A1* | 7/2015 | Krishnan | H04M 3/4936 | 704/246 |
| 2015/0288564 A1* | 10/2015 | Peloski | H04L 41/0816 | 709/221 |
| 2016/0055426 A1* | 2/2016 | Aminzadeh | G06N 7/005 | 706/12 |
| 2016/0306689 A1* | 10/2016 | Jain | G06F 11/0742 | |
| 2017/0060574 A1* | 3/2017 | Malladi | G06F 8/70 | |
| 2017/0169325 A1* | 6/2017 | McCord | H04M 3/5235 | |
| 2017/0188216 A1* | 6/2017 | Koskas | H04W 4/90 | |
| 2017/0223190 A1* | 8/2017 | Mandel | H04M 3/5233 | |
| 2018/0121859 A1* | 5/2018 | de Bold | G06N 5/04 | |
| 2018/0131810 A1* | 5/2018 | Yokel | G06N 5/048 | |
| 2018/0233128 A1* | 8/2018 | Chen | G10L 15/063 | |
| 2018/0240158 A1* | 8/2018 | Peng | G06Q 30/0271 | |
| 2018/0261203 A1* | 9/2018 | Zoller | G10L 13/027 | |
| 2018/0285772 A1* | 10/2018 | Gopalan | G06N 7/005 | |
| 2018/0300124 A1* | 10/2018 | Malladi | H04L 29/08 | |
| 2018/0301017 A1* | 10/2018 | Dizengof | G08B 25/006 | |
| 2018/0307725 A1* | 10/2018 | Iwamoto | G06F 16/334 | |
| 2018/0308100 A1* | 10/2018 | Haukioja | G06F 21/32 | |
| 2018/0314982 A1* | 11/2018 | Gopalan | G06N 20/10 | |
| 2018/0315260 A1* | 11/2018 | Anthony | G07C 5/0808 | |
| 2018/0322394 A1* | 11/2018 | Nguyen | G06N 3/088 | |
| 2018/0324297 A1* | 11/2018 | Kent | H04M 3/42042 | |
| 2018/0338041 A1* | 11/2018 | McGann | G06N 7/005 | |
| 2019/0073997 A1* | 3/2019 | Millen | G10L 25/51 | |
| 2019/0141183 A1* | 5/2019 | Chandrasekaran | H04M 3/436 | |
| 2019/0180175 A1* | 6/2019 | Meteer | G06N 20/00 | |
| 2019/0188583 A1* | 6/2019 | Appel | G06N 20/00 | |
| 2019/0222540 A1* | 7/2019 | Relangi | H04L 51/02 | |
| 2019/0279256 A1* | 9/2019 | Sisselman | H04M 3/5191 | |
| 2019/0287132 A1* | 9/2019 | Linihan | G06Q 30/0269 | |
| 2019/0311374 A1* | 10/2019 | Dai | G06F 17/2705 | |
| 2019/0347668 A1* | 11/2019 | Williams | G06N 20/00 | |

* cited by examiner

SYSTEM AND METHOD FOR PROVIDING ENHANCED ROUTING IN A CONTACT CENTER

FIELD

The disclosure relates generally to contact centers and particularly to systems and methods for routing communication sessions in a contact center.

BACKGROUND

An Internet of Things (IoT) is a network of physical devices with sensors, such as, vehicles, home appliances, medical devices, and other network elements embedded with electronics, software, sensors, actuators, etc. These devices enable IoT devices to connect and exchange data, which creates opportunities for more direct integration of the physical world into computer-based systems. This can result in efficiency improvements, economic benefits, and reduced human exertions (See https://en.wikipedia.org/wiki/Internet_of_things)

Typically, contact centers monitor and respond to events. Attributes are used to provide optimal matching of customers, agents, and other resources in the contact center where the events are handled by humans and bots. One area that is evolving is the automation of event reporting and management that does not require a human user to contact the contact center directly. However, currently, the contact centers of today fail to leverage the full capabilities of using IoT devices to provide an enhanced contact center experience.

SUMMARY

These and other needs are addressed by the various embodiments and configurations of the present disclosure. A first request to establish a communication session with a contact center is received from a user communication device. For example, a request to establish a voice communication session is received at the contact center. A machine learning model uses prior communication sessions with the contact center to identify a first set of one or more sensors that are external to the user communication device. External sensor information is received (e.g., during the request to establish the communication session) by the contact center. The external sensor information is from the first set of one or more sensors that are external to the user communication device. The communication session in the contact center is routed based on the received external sensor information. For example, instead of the communication session being routed to an Interactive Voice Response (IVR) system, the communication session is routed to a high priority contact center queue.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
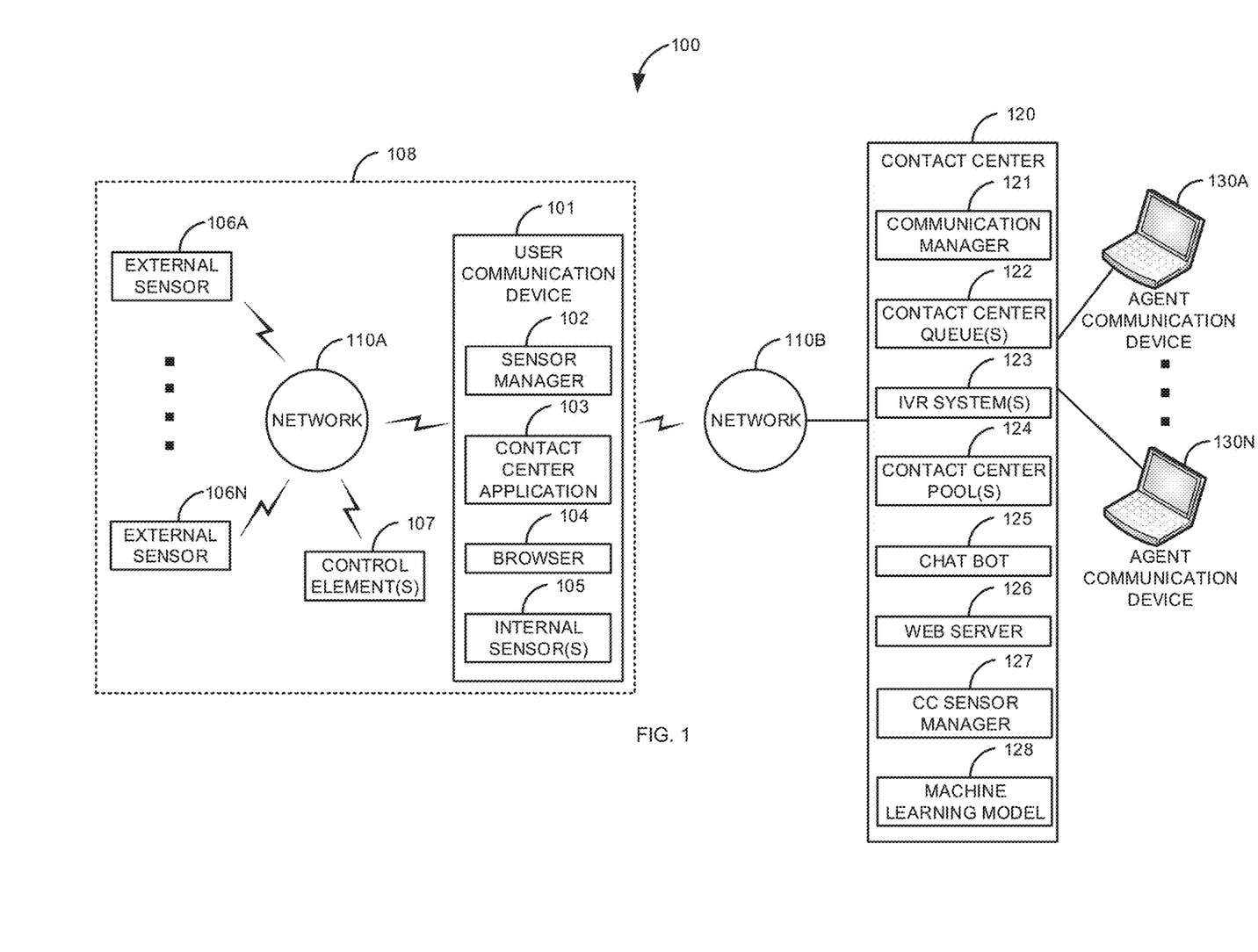
FIG. 1 is a block diagram of a first illustrative system for providing enhanced routing in a contact center.

FIG. 1 is a block diagram of a first illustrative system 100 for providing enhanced routing in a contact center 120. The first illustrative system 100 comprises a user communication device 101, external sensors 106A-106N, control element(s) 107, a location 108, networks 110A-110B, a contact center 120, and agent communication devices 130A-130N.

The user communication device 101 can be or may include any user device that can communicate on the network 110, such as a Personal Computer (PC), a telephone, a video system, a conferencing system, a cellular telephone, a Personal Digital Assistant (PDA), a tablet device, a notebook device, a smartphone, and/or the like. Although not shown for convenience, additional user communication devices 101 may be connected to the network 110B.

The user communication device 101 is shown connected to the networks 110A-110B using wireless protocols. However, the user communication device 101 may be connected to either of the networks 110A-110B using any known protocols, such as, wireless, wired, fiber optic, WiFi, Bluetooth, Ethernet, H.323, SIP, and/or the like.

The user communication device 101 further comprises a sensor manager 102, a contact center application 103, a browser 104, and internal sensor(s) 105. The sensor manager 102 can be or may include any hardware coupled with firmware/software that can manage and collect information from the internal sensor(s) 105/external sensor(s) 106A-106N. The sensor manager 102 may retrieve information from the internal sensor(s) 105/external sensors 106A-106N. The sensor manager 102 may send instructions to any one of the internal sensor(s) 105/external sensors 106A-106N to take a reading and/or take an action. The sensor manager 102 may be part of the contact center application 103.

The contact center application 103 can be or may include any software/firmware that can communicate with the contact center 120. The contact center application 103 can be used to establish a communication session with the contact center 120. For example, the contact center application 103 may be used to initiate a voice, video, Instant Messaging (IM), text messaging, email, virtual reality communication session, and/or the like with the contact center 120. The contact center application 103 can be used to receive an incoming communication session (i.e. the same types of communication sessions discussed above) from the contact center 120.

The browser 104 can be or may include any known browser 104, such as, Google Chrome™, Safari™, Internet Explorer™, Opera™, Firefox™, and/or the like. In one embodiment, the contact center application 103 may be running in the browser 104 (e.g., where the contact center application 103 is provided as a web page via the web server 126).

The internal sensor(s) 105 can be or may include any sensors that are internal to the user communication device 101, such as, a touch screen, an accelerometer, a microphone, a camera, a button, a Global Positioning Satellite (GPS) system, and/or the like.

The external sensors 106A-106N can be or may include any external sensor 106, such as, a camera, a pressure sensor, an Radio Frequency Identification (RFID) sensor, a heart monitor, a blood pressure monitor, a temperature sensor, a humidity sensor, a microphone, a biometric sensor (e.g., a retinal scanner), a blood oxygen sensor, a motion detector, a facial scanner, a door sensor, a window sensor, a LYDAR system and/or the like.

The control element(s) 107 can be or may include elements that can be controlled remotely, such as, a medical device, a camera (control rotation/zoom), a light, a printer, an appliance, an alarm, a radio, a vehicle, a LIDAR system, a display, an automated vehicle control system, a heating/air conditioning system, and/or the like. A control element 107 may also have one or more sensors 106. For example, a heart monitor may have one or more sensors 106 that can be remotely controlled by the contact center sensor manager 127.

The location 108 may be any location that is around the user communication device 101, such as a room, a vehicle, a building, an area, and/or the like. The location 108 may change as the user communication device 101 moves.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), and the like. Thus, the networks 110A-110B are electronic communication networks configured to carry messages via packets and/or circuit switched communications. In one embodiment, the network 110A is typically a private network, such as, a home network, a corporate network, a vehicle network, and/or the like and the network 110B is typically a public network, such as the Internet or PSTN. In one embodiment the networks 110A-110B may be the same network.

The contact center 120 can be or may include any hardware coupled with software that can manage communication sessions between the user communication device 101 and the contact center 120/agent communication devices 130A-130N. The contact center 120 further comprise a communication manager 121, contact center queue(s) 122, IVR system(s) 123, contact center pool(s) 124, a chat bot 125, a web server 126, a contact center sensor manager 127, and a machine learning model 128.

The communication manager 121 can be or may include any hardware coupled with firmware/software that can manage and route communication sessions in the contact center 120, such as a Private Branch Exchange (PBX), and Automatic Call Distribution (ACD) system, a router, a network switch, an IM server, an email server, and/or the like. The communication manager 121 can manage and route various types of communication sessions, such as, voice, video, multimedia, virtual reality, IM, email, text messaging, and/or the like.

The contact center queue(s) 122 can be or may include any computer construct that can be used to hold communication sessions. For example, the contact center queue(s) 122 can be used to hold voice communication sessions that are eventually routed to the agent communication devices 130A-130N. The contact center queue(s) 122 can hold any kind of communication session.

The IVR system(s) 123 can be or may include any system that can interact with a user via voice. The IVR system(s) 123 may be used to gather information from users to make routing decisions in the contact center 120. For example, the IVR system(s) 123 may be used to route an incoming voice/video communication session to a contact center queue 122 or contact center pool 124.

The contact center pool(s) 124 can be or may include any computer construct that can hold a communication until selected by a contact center agent. The contact center pool(s) 124 can hold any kind of communication sessions.

The chat bot 125 can be or may include any hardware coupled with software that can interact with a user via text, such as, an Instant Messaging (IM) bot, a text messaging bot, a web server bot, and/or the like.

The web server 126 can be or may include any known web server 126, such as Apache™, IIS™, Nginx™, and/or the like. The web server 126 may provide the contact center application 103 to the user communication device 101 via the browser 104.

The contact center sensor manager 127 can be or may include any firmware/software that can manage information received from the sensor application 102. The contact center sensor manager 127 can also control the control element(s) 107.

The machine learning model 128 can be or may include any software that can automatically be used to identify which contact center agents, devices, and/or sensors 105/106 can handle specific types of communication sessions with specific customers to provide maximum efficiency and customer satisfaction in the contact center 120. The machine learning model 128 can constantly improve functions for routing the communication sessions in the contact center 120. The machine learning model 128 can be or may include any learning algorithm(s), such as, a linear regression algorithm, a logistic regression algorithm, a decision tree algorithm, a Naïve Bayes algorithm, a K-means algorithm, and/or the like.

The agent communication devices 130A-130N can be or may include any user communication device, such as the user communication device 101. In one embodiment, an agent communication device (e.g., 130A) may comprise multiple agent communication devices 130, such as a telephone and a personal computer.

Figure 2:
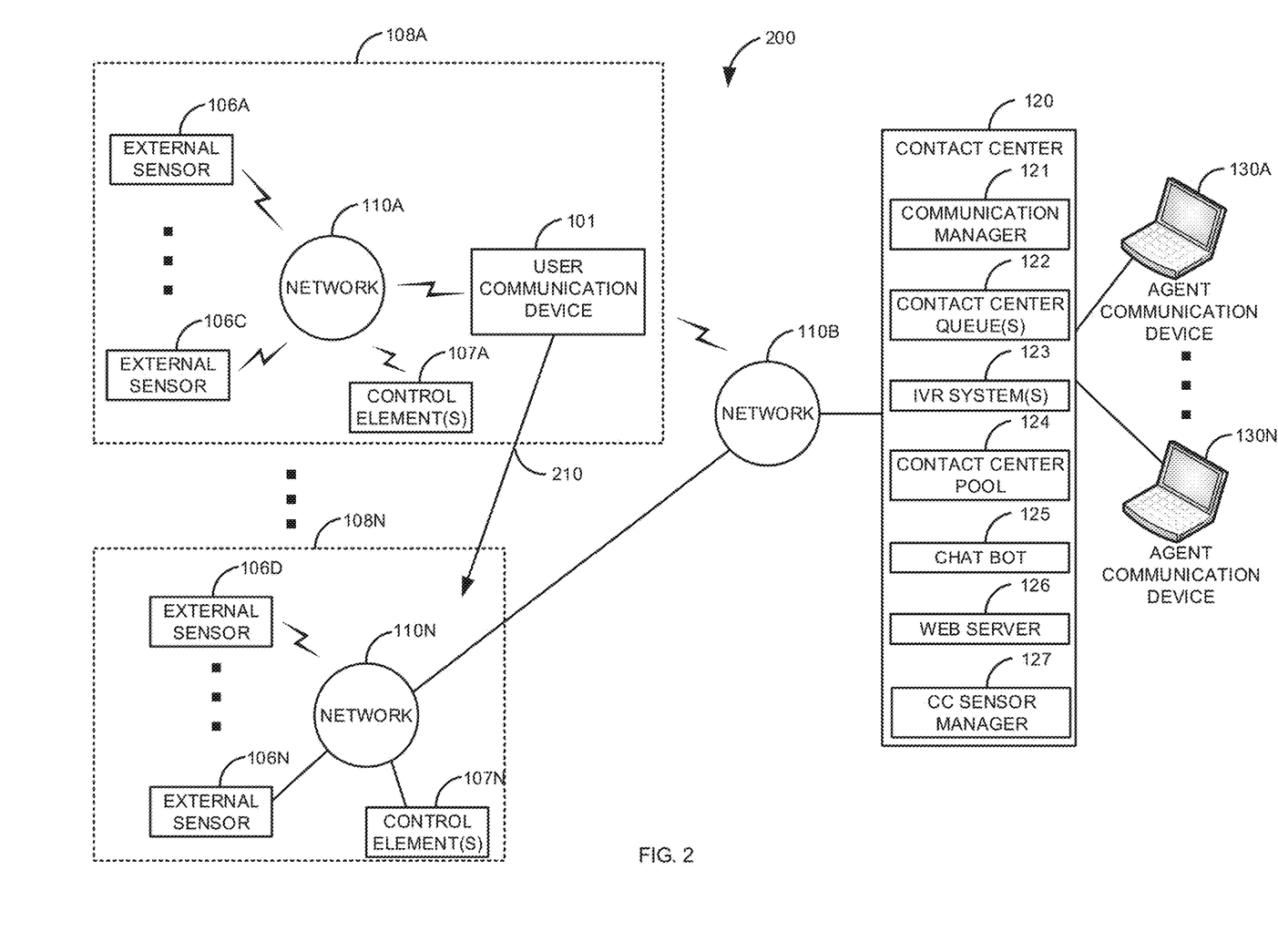
FIG. 2 is a block diagram of a second illustrative system for providing enhanced routing in a contact center based on multiple locations of a user communication device.

FIG. 2 is a block diagram of a second illustrative system 200 for providing enhanced routing in a contact center 120 based on multiple locations 108A-108N of a user communication device 101. The second illustrative system 200 comprises the user communication device 101, the external sensors 106A-106N, control element(s) 107A-107N, locations 108A-108N, networks 110A-110N, the contact center 120, and the agent communication devices 130A-130N.

The network 110N is typically similar to the network 110A. However, the network 110N may be a public or private network based on implementation (e.g., based on the location 108N).

FIG. 2 is used to show how the user communication device 101 moves from the location 108A to the location 108N as shown by step 210. As the user communication device 101 moves from the location 108A (e.g., from a first room in a home) another location, the external sensors 106A-106C, the control element(s) 107A, and/or the network 110A may change as shown in step 210. For example, the user communication device 101 (e.g., a smartphone) may move from the home location 108A to a location 108N on a street. In this example, the network 110A may change from a WiFi network to a cellular network 110N. The external sensors 106A-106C in the home may change to public sensors 106D-106N in the street. Likewise, the control element(s) 107A may change from home control elements 107 (e.g., medical devices/appliances) to control systems 107N in the street (e.g., a camera/light).

Figure 3:
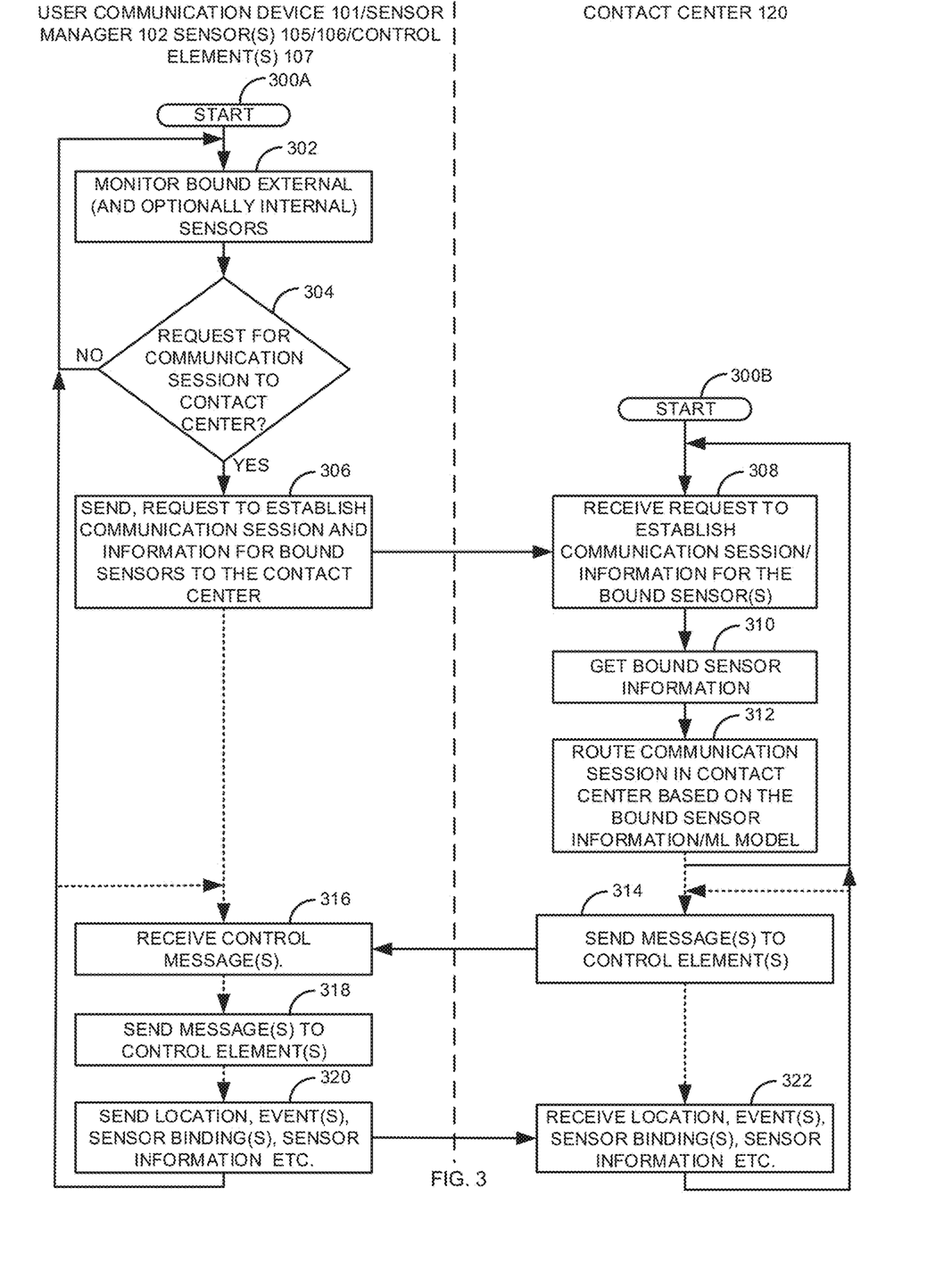
FIG. 3 is a flow diagram of a process for providing enhanced routing in a contact center.
Figure 4:
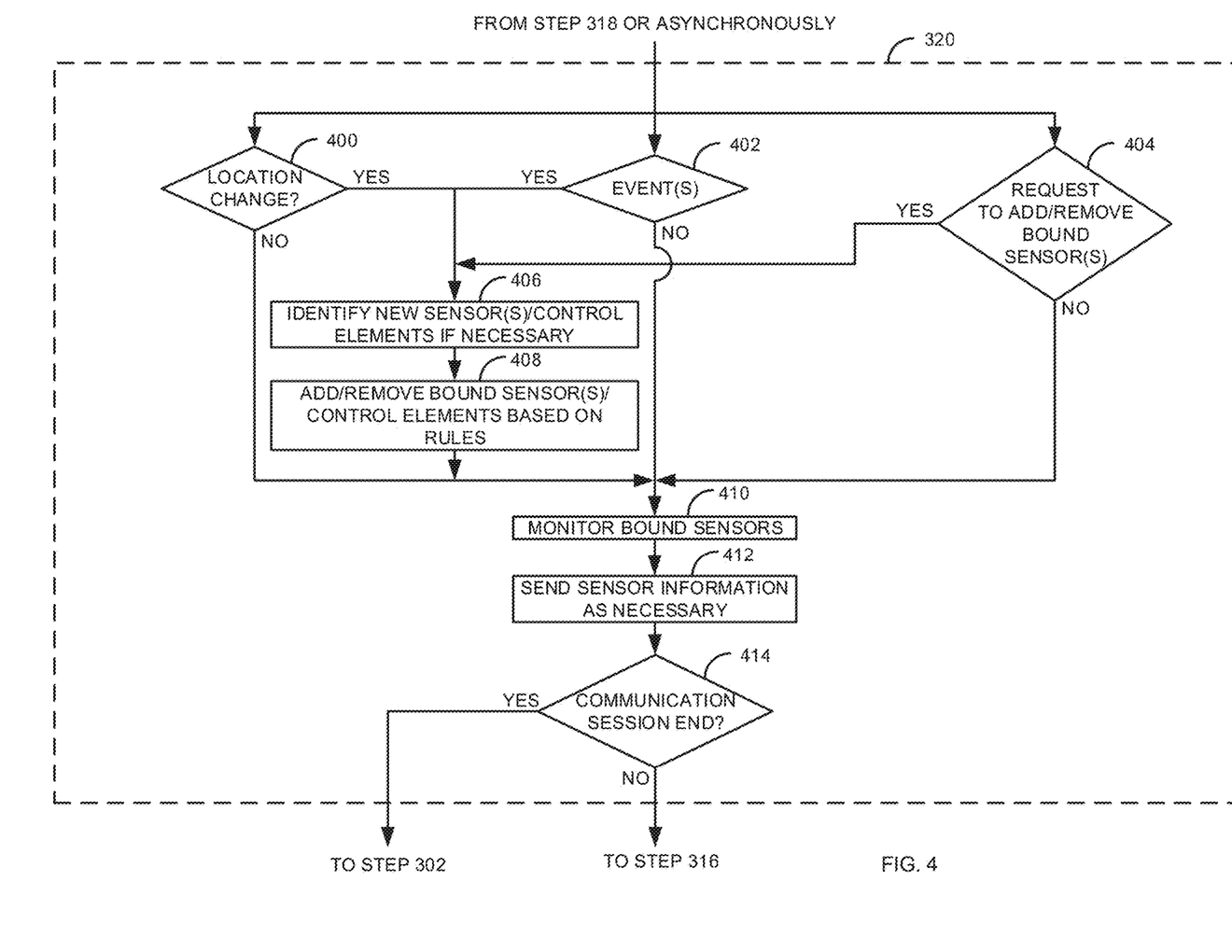
FIG. 4 is a flow diagram for dynamically binding sensors to a communication session.
Figure 5:
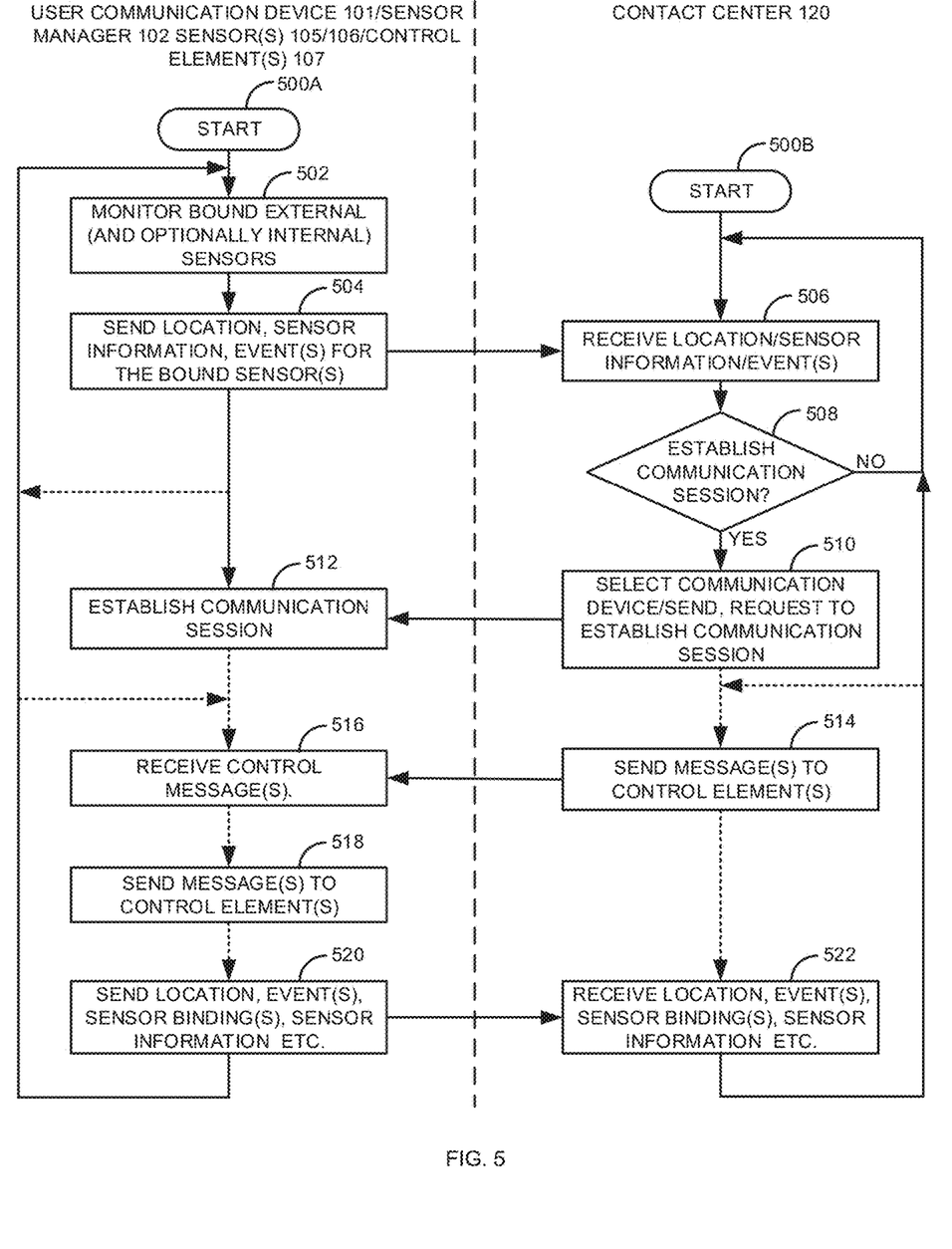
FIG. 5 is a flow diagram of a process for providing enhanced routing in a contact center.

FIG. 3 is a flow diagram of a process for providing enhanced routing in a contact center 120. Illustratively, the user communication device 101, the sensor manager 102, the contact center application 103, the browser 104, the internal sensor(s) 105, the external sensors 106A-106N, the networks 110A-110N, the contact center 120, the communication manager 121, the contact center queue(s) 122, the IVR system(s) 123, the contact center pool(s) 124, the chat bot 125, the web server 126, the contact center sensor manager 127, and the agent communication devices 130A-130N are stored-program-controlled entities, such as a computer or microprocessor, which performs the method of FIGS. 3-5 and the processes described herein by executing program instructions stored in a computer readable storage medium, such as a memory (i.e., a computer memory, a hard disk, and/or the like). Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process for the user communication device 101 starts in step 300A. The process for the contact center 120 starts in step 300B. The sensor manager 102 monitors bound external sensor(s) 106A-106N and optionally internal sensor(s) 105 in step 302. A sensor (105/106) may be bound in various ways, such as, statically or dynamically. For example a sensor 105/106 may be statically bound based on a user selection, predefined rules, administration, and/or the like.

A sensor 105/106 may dynamically bound based on various factors, such as, a context. For example, a context may include a location 108 of the user communication device 101 (e.g., a specific room in a house), people in the location 108, a type of problem of a user of the user communication device 101 (e.g., an erratic heartbeat), a context of the user of the user communication device 101 (e.g., who is using the user communication device 101), sensors 106 in the location 108 of the user communication device 101 (e.g., those who can be managed), and/or the like. In one embodiment, a combination of static and dynamic binding of sensors 105 may be used. The context may be based on various other factor(s) than location. For example, the context may be where the customer is reporting a specific event (e.g., the customer is expressing the symptoms of Carbon Monoxide poisoning). In this example, the machine learning model 128 may dynamically bind one or more Carbon Monoxide sensors 106 and/or a furnace sensor 106 in the house to see if there is really a Carbon Monoxide problem in the customer's house.

The contact center application 103 determines if there is a request to establish a communication session to the contact center 120 in step 304. If there is not a request for a communication session in step 304, the process goes back to step 302.

Otherwise, if there is a request to for a communication session with the contact center 120, in step 304, a request to for the communication session with the contact center 120 is sent in step 306. For example, a SIP INVITE message is sent in step 306 to establish a communication session with the contact center 120. In addition, information for the bound sensors 105/106 is sent in step 306. The information may be sent in the request to establish the communication session with the contact center 120 or in a separate message. For example, the information for the bound sensors 105/106 may be in a specific SIP header.

The contact center 120 (i.e., the communication manager 121) receives the request to establish the communication session/sensor information for the bound sensors 105/106 and establishes the communication session in step 308. The contact center sensor manager 127 gets the bound sensor information in step 310. The bound sensor information may be based on the machine learned model 128. For example, the bound sensor information may be based on a history of prior communication sessions with the contact center 120. The bound sensors 105/106 may be identified based on how prior customers and/or the same customer interacted with various contact center agents. For example, if the customer has had specific medical problems in the past that require the use of specific sensors 105/106 (e.g., specific types of readings), the bound sensors 105/106 may be different from another customer. Based on the bound sensor information, the communication manager 121 routes the communication session in the contact center 120 in step 312. For example, based on the sensor information, the communication manager 121 may route the communication session to one of the contact center queue(s), the IVR system 123(s), the contact center pool(s) 124, the chat bot 125, the web server 126, and/or the like. In addition, one or more menus on the IVR system 123 or messages provided by the chat bot 125 may dynamically change based on the sensor information.

The routing of step 312 may be also based on the machine learned model 128. For example, based on previous interactions of multiple different customers with a specific contact center agent, the machine learned model 128 may identify that particular contact center agent as an expert in handling a specific type of medical condition versus another contact center agent who has to continually escalate the communication to an expert. The routing may be based on the customer saying in a communication session that a specific contact center agent was particularly helpful. In this example, the communication session may be automatically routed based on the machine learning model 128 to the specific contact center agent communication device 130 based on the contact center agent's expertise and/or helpfulness. The prior history may be used by the machine learning model 128 to identify a specific contact center queue 122, IVR system 123, contact center pool 124, chat bot 125, web server 126, and/or the like for routing the communication session. For example, based on a specific sensor of an alarm system triggering, the machine learning model 128 may route the communication session to a specific contact center queue 122 where in the past the communication session was routed to a different contact center queue 122.

In one embodiment, an IVR menu may be dynamically changed based on the machine learning model 128. For example, the machine learning model 128 may learn after a customer has called in more than twice that a specific menu is to be played to the customer because it is more likely that the customer will select the specific menu. In this case, the customer does not have to navigate through a series of menus to get to the menu he/she wants.

The contact center sensor manager 127, via the communication manager 121, may optionally send a message(s) to the sensor manager 102 to control a control element(s) 107 in step 314. The sensor manager 102 receives the control message(s) in step 316. The sensor manager 102 then sends the message(s) to the control element(s) 107 in step 318.

The sensor manager 102, via the contact center application 103, sends the updated location, event(s) (e.g., a change from a normal heart rate to a dangerous heart rate), sensor binding(s), and/or sensor information to the contact center 120 in step 320. The contact center sensor manager 127 receives the updated location, event(s), sensor binding(s), and/or sensor information in step 322. For example, based on the message of step 314, the sensor manager 102 sends the location/event(s)/binding(s)/sensor information in step 320 to the contact center sensor manager 127. The user communication device 101 process then goes back to step 302 when the communication session ends or back to step 316 while the communication session is established (indicated by the dashed line). In one embodiment, the process may go back to step 312 and reroute the communication session based on the received sensor information of step 322. The contact center process goes back to step 308 when the communication session ends or back to step 314 while the communication session is established (indicated by the dashed line). The location, event(s), sensor bindings, sensor information of step 320 may be sent based on the message of step 314 or may be sent asynchronously at any time during the communication session.

To illustrate the process of FIG. 3, consider the following example. A user, who is an elderly patient, has a group of sensors that are bound to his home telephone. The bound external sensors 106A-106N are a heart monitoring device, a video camera, and a blood pressure monitor. The sensor manager 102 captures data from the bound external sensors 106A-106N in step 302. The user, who is not feeling well, makes a call to the contact center 120 in step 304. The request is sent to the contact center 120 in step 306 along with the user's heart rate, the user's blood pressure, and a picture of the user. The contact center 120 receives the request and establishes the communication session in step 308. The contact center sensor manager 127 gets the bound sensor information in step 310. The contact center sensor manger 127 determines that the user has a high heart rate/blood pressure and routs the communication to a high priority contact center queue 122 in step 312. The user may be actually moved to the top of the contact center queue 122 based on how severe the heart rate/blood pressure is. The contact center sensor manger 127 sends, during the communication session, a control message to take another blood pressure reading in step 314 (e.g., based on a request from the contact center agent). The message is received in step 316 by the user communication device 101 and then sent to the blood pressure monitor in step 318. The sensor manager 102 receives the updated heart rate and sends the updated heart rate in step 320 to the contact center sensor manager 127. The contact center sensor manager 127 receives the updated heart rate and displays this information to a contact center agent in step 322.

FIG. 4 is a flow diagram for dynamically binding sensors 105/106 to a communication session. FIG. 4 is illustrative example of step 320 of FIG. 3. The process of FIG. 4 could also be used for step 302 of FIG. 3. In FIG. 4, steps 400, 402, and 404 may happen in parallel (e.g., based on separate threads) and/or in series. After the messages are sent to the control elements in step 318 (or asynchronously during the communication session), the sensor monitor 102 determines if there is a location change in step 400. For example, a location change may be based on GPS. If there is not a location change in step 400 the process goes to step 410. Otherwise, if there is a location change in step 400, the sensor monitor 102 identifies new external sensors 106 (and also control elements 107) if necessary in step 406. For example, if a user has left the house (a first location 108A) and moves to a vehicle (a second location 108N), the sensors 105/106/control element(s) 107 that can be managed by the sensor monitor 102 are identified in step 406. Sensors 105/106/control elements 107 are added/removed as necessary to the bound sensors based on rules in step 408. For example, a camera in the house may be removed and a camera in vehicle may be added in step 408. The process then goes to step 410 where the sensor monitor 102 monitors the bound sensors 105/106. The sensor monitor 102 then sends the sensor information as necessary in step 412 (e.g., according to rules). If the communication session has ended in step 414, the process goes to step 302. Otherwise, if the communication session has not ended in step 414, the process goes back to step 316.

The sensor monitor 102 determines, in step 402, if an event has occurred. An event can be or may include any event that can be defined by one or more rules. For example, an event may be, a detected high heart rate, a high blood pressure, a movement, a lighting level, a spoken word, a volume level, an accident (e.g., by an accident sensor in a vehicle), associated with a user of the first user communication device 101, a group of users associated with the first user communication device 101, and/or the like. If an event is not detected in step 402, the process goes to step 410. Otherwise, if an event is detected in step 402, the process goes to step 406 where new sensors are identified if necessary. For example, if a high heart rate is detected in step 402, the sensor monitor 102 may identify a camera as a new external sensor 106 to see if the user is moving. The steps of 408-414 are then implemented.

The sensor monitor 102 determines, in step 404, if a request to add and/or remove a sensor 105/106 from the bound sensors is received. For example, the message of step 314 may have a request to add and/or remove a sensor 105/106 from the bound sensors. If a request to add and/or remove a bound sensor in step 404 is not received, the process goes to step 410. Otherwise, if a request to add and/or remove a bound sensor is received in step 404, the process goes to step 406-414 as described previously.

FIG. 5 is a flow diagram of a process for providing enhanced routing in a contact center 120. The process for the user communication device 101 starts in step 500A. The process for the contact center 120 starts in step 500B. The sensor manager 102 monitors bound external sensor(s) 106A-106N and optionally internal sensor(s) 105 in step 502. As discussed in FIG. 3, a sensor (105/106) may be bound in various ways, such as, statically or dynamically. The sensor manager 102 sends, in step 504, location information, sensor information, and/or event(s) for the bound sensors. The process of steps 502-504 may repeat as indicated by the dashed line after step 504.

The contact center sensor manager 127 receives the location information, sensor information, and/or event(s) in step 506. The contact center sensor manager 127 determines, in step 508, if there is a need to establish a communication session with the user communication device 101. For example, if a user's heart rate has increased over a threshold. If there is not a need to establish a communication session in step 508, the process goes back to step 506. Otherwise, if there is a need to establish a communication session in step 508, the communication manager 121 sends, in step 510, a request to establish a communication session in step 510. In step 510, a communication device is selected (i.e., a communication agent device 130, a contact center queue 122, an IVR system 123, a contact center pool 124, a chat bot 125, a web server 126, etc.) that is used to establish the communication session with the user communication device 101. The communication device is selected based on the received location/senor/event(s) of step 506. The user communication device 101 receives the request to establish the communication session and establishes the communication session with the contact center 120 (e.g., with a contact center agent) in step 512.

The contact center sensor manager 127, via the communication manager 121, may optionally send a message to the sensor manager 102 to control a control element(s) 107 in step 514. The sensor manager 102 receives the control message(s) in step 516. The sensor manager 102 then sends the message(s) to the control element(s) 107 in step 518.

The sensor manager 102, via the contact center application 103, sends the updated location information, event(s), sensor binding(s), and/or sensor information to the contact center 120 in step 520. For example, based on the message of step 514, the sensor manager 102 sends the location/event(s)/binding(s)/sensor information in step 520 to the contact center sensor manager 127. The process then goes back to step 502 if the communication session has ended or back to step 516 (indicated by the dashed line) if the communication session has not ended. Likewise, the process in the contact center 120 goes back to step 506 if the communication has ended or back to step 514 if the communication session has not ended. The location, sensor bindings, sensor information of step 520 may be sent based on the message of step 514 or may be sent asynchronously.

For example, steps 514/522 may be running as a separate thread that runs during the communication session. Likewise, step 516-520 may be running as a separate thread in the contact center 120. In addition, the process of FIG. 4 may also be used in steps 504/520 of FIG. 5.

Figure 6:
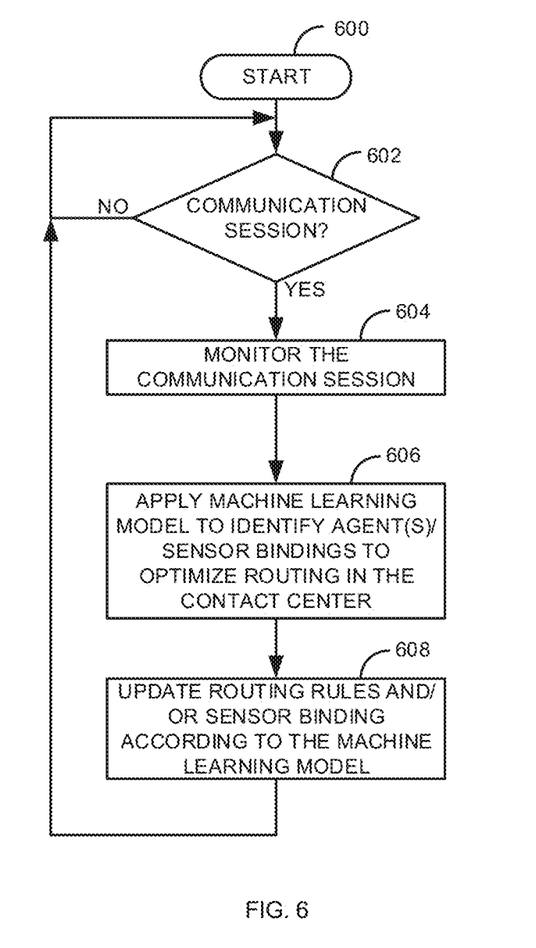
FIG. 6 is a flow diagram of a process for applying a machine learning model to enhance routing and sensor binding in a contact center.

FIG. 6 is a flow diagram of a process for applying a machine learning model to enhance routing and sensor binding in a contact center 120. The process starts in step 600. The communication manager 121 determines, in step 602, if a communication session has been established between the user and a contact center agent. If the communication session has not been established in step 602, the process of step 602 repeats. Otherwise, if the communication session has been established in step 602, machine learning model 128 monitors the communication session in step 604. For example, the machine learning model 128 monitors the communication session for keywords, phrases, inflection, pitch, sound levels (e.g., yelling), levels of stress (e.g., in the voice), gestures, and/or the like. The machine learning model 128 also identifies any sensors 105/106 that are used in the communication session.

The machine learning model 128 applies the model, in step 606, to identify contact center agents/sensor bindings to optimize the routing in the contact center 120. The machine learning model 128 can identify particular contact center agents (e.g., groups of contact center agents that are assigned to a contact center queue 122) that handle specific types of situations better than other types. For example, the machine learning model 128 may learn that the contact center agent A can handle more stressful situations (e.g., where a patient is having a severe media condition) better than contact center agent B (e.g., where the contact center agent B handles routine calls better). In this example, the contact center agent A may be automatically assigned to a different contact center queue 122 than the contact center agent B.

The machine learning model 128 can learn that in certain situations, that additional sensors 105/106 may automatically bound and/or unbound based on what is being said in the communication session. For instance, the machine learning model 128 may learn that based on previous conversations on a specific subject that heart monitor sensor 106 may be needed to take a reading. The machine learning model 128 can then tell the contact center sensor manager 127 to send a message to the user communication device 101A (i.e., sensor manager 102) to take a reading from the heart monitor sensor 106.

The contact center sensor manager 127 then updates the routing rules and/or sensor binding according to the machine learning model in step 608. The updated routing rules/sensor bindings are then used in step 312 of FIG. 3. The process then goes back to step 602 to monitor the next communication session.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive, from a user communication device, a first request to establish a first communication session with a contact center;
identify, based on a machine learned model of prior communication sessions with the contact center, a first set of one or more sensors that are external to the user communication device;
receive first external sensor information, wherein the first external sensor information is from the first set of one or more sensors that are external to the user communication device; and
route the first communication session in the contact center based on the received first external sensor information.

2. The system of claim 1, wherein the first set of one or more sensors that are external to the user communication device are dynamically bound to the first communication session based on a first location of the user communication device when the first request to establish the first communication session is sent from the user communication device.

3. The system of claim 2, wherein the first set of one or more sensors that are external to the user communication device are dynamically unbound from the first communication session and a second set of one or more sensors that are external to the user communication device are dynamically bound to the first communication session based on an event associated with the first communication session.

4. The system of claim 2, wherein the first set of one or more sensors that are external to the user communication device are dynamically unbound from the first communication session and a second set of one or more sensors that are external to the user communication device are dynamically bound to the first communication session based on the user communication device moving from the first location to a second location during the first communication session.

5. The system of claim 2, wherein microprocessor readable and executable instructions that, when executed by the microprocessor, further cause the microprocessor to:
send a second request to the user communication device, where the second request is to dynamically add one or more additional sensors that are dynamically bound to the first communication session; and
receive second external sensor information from the one or more additional sensors that are dynamically bound to the first communication session.

6. The system of claim 2, wherein one or more additional sensors are dynamically bound to the first communication session based on at least one of: an event associated with the one or more additional sensors, an event associated with a user of the first user communication device, and a group of users associated with the first user communication device.

7. The system of claim 2, wherein the microprocessor readable and executable instructions that, when executed by the microprocessor, further cause the microprocessor to:
receive, from the user communication device, a second request to establish a second communication session with the contact center;
receive second external sensor information, wherein the second external sensor information is from a second set of one or more sensors that are external to the user communication device; and
route the second communication session in the contact center based on the second external sensor information, wherein the second communication session is routed differently in the contact center than the first communication session.

8. The system of claim 7, wherein the second set of one or more sensors that are external to the user communication device are dynamically bound to the second communication session based on a different location of the user communication device when the second request to establish the second communication session is sent from the user communication device.

9. The system of claim 1, wherein routing the first communication session in the contact center based on the first external sensor information comprises routing the first communication session to an Interactive Voice Response (IVR) system or chat bot and wherein the first external sensor information is used to dynamically change one or more menus on the IVR system or messages provided by the chat bot.

10. The system of claim 1, wherein, during the first communication session, the first external sensor information changes and wherein the microprocessor readable and executable instructions that, when executed by the microprocessor, further cause the microprocessor to:
reroute the first communication in the contact center based on the changed first external sensor information.

11. A method comprising:
receiving, from a user communication device, a first request to establish a first communication session with a contact center;
identifying, based on a machine learned model of prior communication sessions with the contact center, a first set of one or more sensors that are external to the user communication device;
receiving first external sensor information, wherein the first external sensor information is from the first set of one or more sensors that are external to the user communication device; and
routing the first communication session in the contact center based on the received first external sensor information.

12. The method of claim 11, wherein the first set of one or more sensors that are external to the user communication device are dynamically bound to the first communication session based on a first location of the user communication device when the first request to establish the first communication session is sent from the user communication device.

13. The method of claim 12, wherein the first set of one or more sensors that are external to the user communication device are dynamically unbound from the first communication session and a second set of one or more sensors that are external to the user communication device are dynamically bound to the first communication session based on an event associated with the first communication session.

14. The method of claim 12, wherein the first set of one or more sensors that are external to the user communication device are dynamically unbound from the first communication session and a second set of one or more sensors that are external to the user communication device are dynamically bound to the first communication session based on the user communication device moving from the first location to a second location during the first communication session.

15. The method of claim 12, further comprising:
sending a second request to the user communication device, where the second request is to dynamically add one or more additional sensors that are dynamically bound to the first communication session; and
receiving second external sensor information from the one or more additional sensors that are dynamically bound to the first communication session.

16. The method of claim 12, wherein one or more additional sensors are dynamically bound to the first communication session based on at least one of: an event associated with the one or more additional sensors, an event associated with a user of the first user communication device, and a group of users associated with the first user communication device.

17. The method of claim 12, further comprising:
receiving, from the user communication device, a second request to establish a second communication session with the contact center;
receiving second external sensor information, wherein the second external sensor information is from a second set of one or more sensors that are external to the user communication device; and
routing the second communication session in the contact center based on the second external sensor information, wherein the second communication session is routed differently in the contact center than the first communication session.

18. The method of claim 17, wherein the second set of one or more sensors that are external to the user communication device are dynamically bound to the second communication session based on a different location of the user communication device when the second request to establish the second communication session is sent from the user communication device.

19. The method of claim 11, wherein routing the first communication session in the contact center based on the first external sensor information comprises routing the first communication session to an Interactive Voice Response (IVR) system or chat bot and wherein the first external sensor information is used to dynamically change one or more menus on the IVR system or messages provided by the chat bot.

20. A system comprising:
a microprocessor; and
a computer readable medium, coupled with the microprocessor and comprising microprocessor readable and executable instructions that, when executed by the microprocessor, cause the microprocessor to:
receive external sensor information, wherein the external sensor information is from a first set of one or more sensors that are external to a user communication device;
in response to receiving the external sensor information, initiate, to the user communication device, a request to establish a communication session with a communication device in the contact center, wherein the communication device in the contact center is selected based on the received external sensor information.

* * * * *